April 26, 1960  M. ADER ET AL  2,934,403
RECOVERY OF AMERICIUM
Filed July 18, 1950
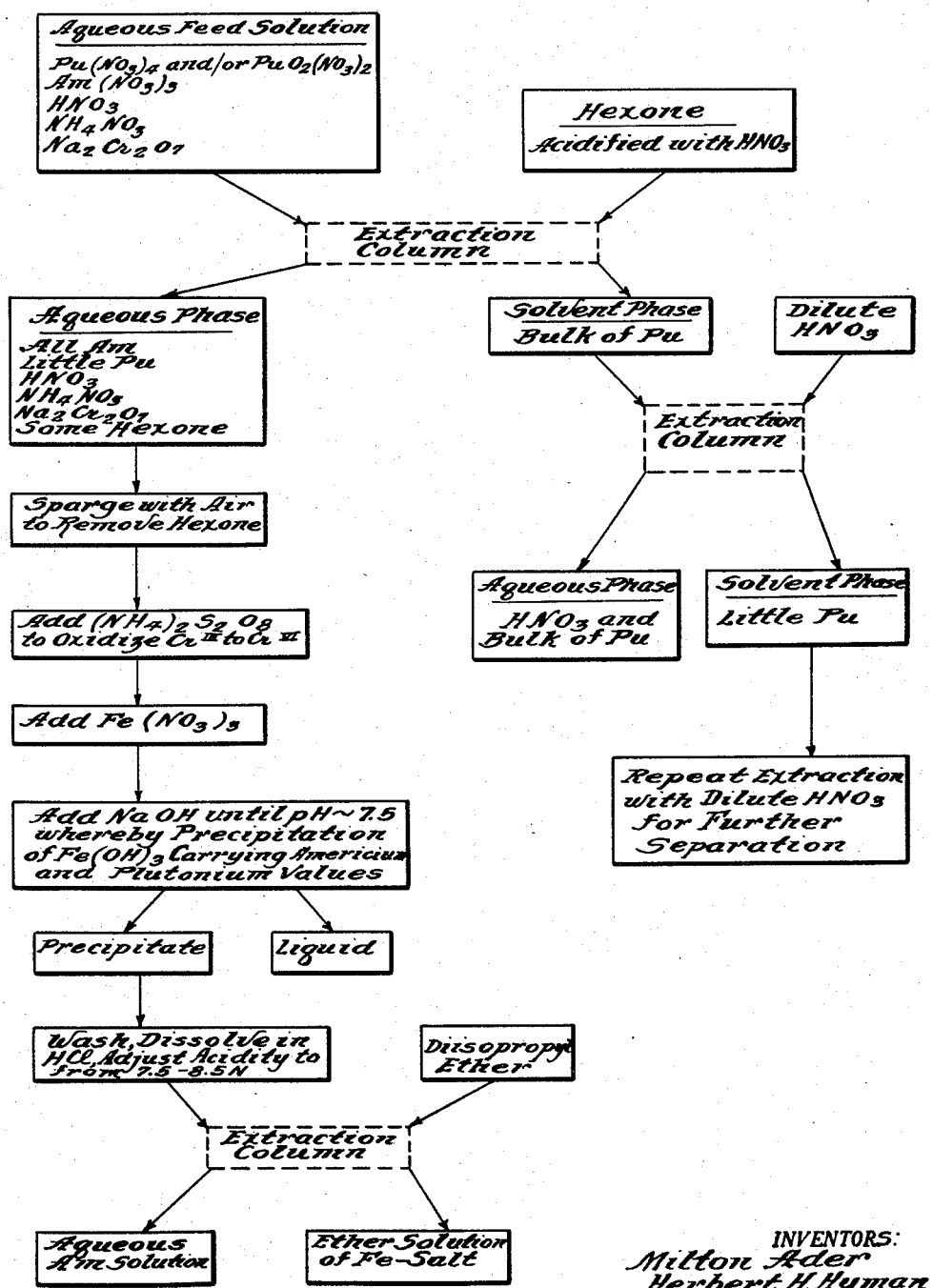
INVENTORS:
Milton Ader
Herbert H. Hyman
BY
Roland A. Anderson
Attorney

2,934,403
RECOVERY OF AMERICIUM

Milton Ader and Herbert H. Hyman, Chicago, Ill., assignors to the United States of America as represented by the United States Atomic Energy Commission Application July 18, 1950, Serial No. 174,550

10 Claims. (Cl. 23—14.5)

This process deals with the recovery of americium from aqueous solutions and also relates to the decontamination of americium from plutonium.

When uranium, e.g., in the form of rods or slugs, is placed in a neutronic reactor having a high neutron flux, $Pu^{240}$ and $Pu^{241}$ are produced along with $Pu^{239}$. Plutonium can be separated from uranium and fission products by many methods. Upon storage of pure plutonium, $Am^{241}$ is produced due to decay of $Pu^{241}$ which is a beta-emitter with a half-life of about ten years. It is desirable to separate and recover the americium from the plutonium and to repeat the americium recovery from time to time as this element is formed anew by further decay of $Pu^{241}$.

It is thus an object of this invention to separate americium from plutonium contained in aqueous solutions.

It is another object of this invention quantitatively to recover americium from aqueous solutions.

It is another object of this invention to provide a process for the purification of americium salts by which a highly pure product is obtained.

These and other objects are accomplished by extracting an aqueous solution containing plutonium and americium salts with a substantially water-immiscible organic solvent whereby plutonium salt is taken up by the solvent while the americium is retained by the aqueous solution, and then separating the aqueous phase from the solvent phase. Americium may be recovered from the aqueous solution by various methods, for instance, by carrier precipitation, while the plutonium may be back-extracted from the solvent with an aqueous medium.

The extraction step is advantageously carried out from an aqueous solution, preferably a mineral acid aqueous solution, and nitric acid is the preferred mineral acid. Trivalent plutonium salts are not extractible to an economical degree, and the plutonium should therefore be in at least the tetravalent state; the highest efficiency is obtained with hexavalent plutonium salts using most of the organic solvents. Americium salts contain americium in its trivalent state.

In order to secure all of the plutonium present in the hexavalent state, an oxidizing agent, such as sodium dichromate, is advantageously added to the aqueous acid solution; the dichromate oxidizes all of the plutonium and also operates as a holding oxidant so that the plutonium is maintained in its hexavalent state during the entire process. While the concentration of the dichromate is not critical, a content of about 0.1 M has been found to be satisfactory. It is advantageous to carry the oxidation to completion by heating or refluxing the solution containing the dichromate.

There are several types of organic compounds that are satisfactory solvents for the extraction in the process of this invention. These types are ethers, glycol ethers, esters, ketones, alcohols, alkyl phosphates, nitrohydrocarbons, and alkyl sulfides. A common structural property of all of these types of compounds is that they have an atom capable of donating an electron pair to a co-ordination bond. The extractive solvent is a liquid substantially immiscible with water and aqueous solutions. If it is a solid at room temperature, the extraction is carried out at a temperature above its melting point. The following is a list of compounds that are suitable extractants for the process of this invention:

Ethyl ether
Isopropyl ether
Butoxyethoxyethane (ethyl butyl "Cellosolve")
Diethyl ether of ethylene glycol (diethyl "Cellosolve")
Dibutyl ether of diethylene glycol (dibutyl "Carbitol")
Dibutyl ether of tetraethylene glycol
Ethyl acetate
n-Propyl acetate
Butoxyethoxyethyl acetate (butyl "Carbitol" acetate)
Methyl isobutyl ketone (hexone)
Acetophenone
Mesityl oxide
Cyclohexanone
Tert-amyl alcohol
2-ethyl-1-hexanol
Tributyl phosphate
Trioctyl phosphate
Dioctyl hydrogen phosphate
Octadecyl dihydrogen phosphate
Nitromethane
Ethyl sulfide
n-Propyl sulfide It is preferred that the organic solvent contain mineral acid, e.g., in a concentration of 0.1 to 1 N.

The extraction is considerably improved if a salting-out agent is added to the solution to be extracted. As salting-out agents, water-soluble inorganic salts are suitable; however, one of the following metal nitrates is preferred: $NaNO_3$, $Ca(NO_3)_2$, $KNO_3$, $Sr(NO_3)_2$, $LiNO_3$, $Mg(NO_3)_2$, $NH_4NO_3$, $La(NO_3)_3$, $Mn(NO_3)_2$, and $Al(NO_3)_3$.

As has been mentioned above, the americium contained in the aqueous phase can be recovered by carrier precipitation. Ferric hydroxide has been found to be an especially efficient carrier for americium. This carrier precipitation is accomplished by adding a water-soluble ferric salt, such as ferric nitrate or ferric chloride, to the aqueous solution after its separation from the solvent phase, and then adding an alkali hydroxide solution for precipitation of the carrier precipitate. Sodium hydroxide is added to precipitate ferric hydroxide and preferably added until a pH of about 7.5 is obtained when ammonium nitrate has been used as salting-out agent in the preceding solvent extraction, this alkalinity being the optimal condition for the precipitation in the presence of ammonium salt. The carrier precipitate, which consists of ferric hydroxide and carries practically all of the americium present, is then separated from the solution and optionally purified. This purification may be achieved by washing the precipitate with water, redissolving it in acid and reprecipitating it.

The americium is then separated from the iron. For this purpose, the carrier precipitate is dissolved in hydrochloric acid, and the resultant solution containing excess hydrochloric acid is then treated with a substantially water-immiscible organic solvent for the iron. Ethers, for instance diethyl ether and diisopropyl ether, are excellent selective extractants for the iron salt.

Some of the chromium ions originally added as dichromate for plutonium oxidation has been reduced to the trivalent state. Trivalent chromium ions, however, are disadvantageous in the ferric hydroxide carrier precipitation process, because $Cr(OH)_3$, when coprecipitated with the ferric hydroxide, causes the formation of a colloidal precipitate which is difficult to separate from the aqueous solution and which will thus impair the purification of the americium. For this reason, it is advisable to oxidize any trivalent chromium that might have formed prior to carrier precipitation; ammonium persulfate has been found a suitable oxidant for this purpose.

Laboratory investigations performed on the carrier precipitation of americium have shown that the loss of americium varies inversely as the ferric ion concentration and directly as the persulfate ion concentration change; the loss is less than 1% at 2 mg./ml. of ferric ion and a persulfate concentration as high as 0.3 M. In every case, however, precipitation of additional ferric hydroxide in the filtrate reduced losses of americium to a negligible amount. In general, substantial portions (from 10 to 60%) of any plutonium that was not extracted by the organic solvent accompanied the americium in this step. Increased digestion time also had a decreasing effect on americium losses (from 4.6% for a five-minute digestion to 1.6% for a four-hour digestion), and it also increased the amount of plutonium carried by the ferric hydroxide (about 60% of the plutonium carried after a five-minute digestion; about 95% after a four-hour digestion). Repeated washings with water or dilute sodium hydroxide caused high losses of americium due to peptization of the ferric hydroxide precipitate. However, one or two initial water washes followed by several ammonium chloride washes was found to be a satisfactory washing procedure. Americium losses are 0.1 to 0.2% for each wash with either liquid. Plutonium also was not appreciably removed by this washing procedure.

In order to avoid the precipitation of salt which would unnecessarily contaminate the carrier precipitate, the concentration of the salting-out agent should be kept within ranges of solubility; in the case of ammonium nitrate, the concentration is preferably maintained at or below 8.5 N during the carrier precipitation.

Nitric acid as well as hydrochloric acid have been found suitable acids for dissolving the carrier precipitate. However, hydrochloric acid is used when iron and americium are separated by solvent extraction. In that case the carrier precipitate solution is preferably adjusted to a concentration of from 7.5 to 8.5 N hydrochloric acid prior to the extraction of the ferric salt. At a concentration of 7.5 N hydrochloric acid, the extraction with ether, for instance, is effected preferably using eleven volumes of ether per one volume of aqueous hydrochloric acid solution; this yielded an extraction of 99.99% of the iron salt present. Less than 1% plutonium was extracted into the solvent under these conditions. Americium remained in the aqueous solution.

In the attached drawing one preferred embodiment of the process of this invention is illustrated by means of a flow sheet. The specific materials and conditions given there are merely shown for the purpose of illustration without the intention to limit the invention to these specific details.

Likewise, the examples given below merely show specific embodiments of the process for the purpose of illustration and the scope of the invention is not intended to be restricted by the details given therein.

*Examples I and II*

Two columns were used in each experiment, one for the extraction of plutonium into hexone and the second one for back-extracting the plutonium into an aqueous phase from the hexone or for "stripping" the hexone.

Each column had a diameter of 1"; the extracting column was 14' high and the stripping column 9' 6" high. Both columns were packed with helices leaving a free bottom section of 4" in the column. The height of the packed section was 10' 11.5" in the extracting and 6' 8" in the stripping column. Above the packed section each there was a free top section for the separation of the solvent and aqueous phases. In the extraction column a space of 1482 cc. was not occupied by packing helices. In each column the available space for liquid in the packed section was 92 cm.$^3$/ft. of height.

In each of the two experiments an "inactive" solution was first fed into the extraction column until the packing section was covered. This inactive solution had the same concentration with regard to sodium dichromate, ammonium nitrate and nitric acid as the "feed solution" (described below) to be treated, but was free from americium and plutonium or other radioactive materials. The remaining space in the top of the column was filled with hexone. Thereafter, feed solution was introduced near the top of the column and at the same time acidified hexone near the bottom of the column for the extraction proper. After completion of the extraction step for the purpose of these experiments, feed solution again was replaced by the aforementioned inactive solution introduced at the top for one and one-fourth hours. Thereafter both, supply of hexone and that of aqueous solution were discontinued and the aqueous and organic phases in the column were allowed to separate. Finally, additional inactive solution was introduced to displace all of the hexone. In the extraction column the feed solution was the continuous phase, while the acid aqueous solution was the continuous phase in the stripping column.

All of the aqueous phases obtained in the extraction column were combined and collectively analyzed. The hexone phase leaving the extraction column at the top was introduced near the bottom of the stripping column where it was contacted in countercurrent flow with dilute nitric acid for back-extraction.

The solvent leaving the back-extraction column still retained small quantities of plutonium. In order to recover also these amounts, the solvent was batch-extracted three times each with 0.5 liter of 0.1 N nitric acid whereby the plutonium losses were considerably reduced.

The feed solutions were prepared as follows: To 4.8 liters (Example I) and 4.4 liters (Example II), respectively, of a nitric acid plutonium nitrate solution, obtained by dissolving neutron-irradiated uranium slugs in nitric acid and separating the uranium and fission products from the plutonium, there was added sodium dichromate in a quantity to obtain a concentration of 0.1 M in the final volume of 10-liter feed solution. The solutions were refluxed in each instance for several days whereby the plutonium was oxidized almost entirely to its hexavalent state. After completion of this oxidation step, the volumes of the solutions were reduced to about 2.5 liters by boiling under slightly reduced pressure. The acidity was then adjusted so that it corresponded to 0.23 and 0.3 N nitric acid in the final 10-liter feed solutions, thereafter a saturated ammonium nitrate solution was admixed in a quantity to yield an 8 N ammonium nitrate solution in the final feed solutions having a volume of 10 liters.

These feed solutions were then introduced into the extraction column and contacted there with hexone containing 0.22 N nitric acid.

In the following table the concentrations of the various solutions of both examples are compiled along with the data including those showing the efficiency of the process of the invention.

|  | Example I | Example II |
|---|---|---|
| Pu initial, g | 102.0 | 58.1 |
| Feed solution: |  |  |
| Flow rate, cc./min | 44.1 | 43.9 |
| Volume, liters | 9.65 | 9.95 |
| Pu and Am, counts/min | 7.72×10$^{12}$ | 4.10×10$^{12}$ |
| Pu (IV) and Am, counts/min | 3.18×10$^{10}$ | 9.83×10$^{10}$ |
| Pu (IV) in Pu total, percent | 3.7 | 2.4 |
| HNO$_3$, N | 0.23 | 0.30 |
| Na$_2$Cr$_2$O$_7$, M | 0.1 | 0.1 |
| NH$_4$NO$_3$, N | 8.3 | 8.4 |
| Solvent used for extraction: |  |  |
| Flow rate, cc./min | 44.1 | 46.2 |
| HNO$_3$, N | 0.22 | 0.22 |
| Aqueous solution for strip: |  |  |
| HNO$_3$, N | 0.1 | 0.1 |
| Flow rate, cc./min | 26.95 | 27.2 |
| Extraction efficiency: |  |  |
| Percent Pu remaining in aq. feed soln | 0.016 | 0.010 |
| Am recovered, mg | 11.4 | 4.8 |
| Pu decontamination factor [1] | 6.10×10$^3$ | 9.86×10$^3$ |
| Back-extraction: |  |  |
| Percent Pu loss in column raffinate (solvent) | 0.198 | 0.60 |
| Percent Pu loss after batch stripping of solvent raffinate | 0.0002 | 0.00035 |
| Percent Am lost in centrifugate and washes | 0.2 | 0.71 |

[1] Pu decontamination factor is ratio of Pu initially with Am to Pu remaining with Am after extraction.

The aqueous phases from the extraction column were treated further for the recovery of americium and plutonium from the ammonium nitrate solutions and to effect a volume reduction so that further separation of americium from plutonium could be more easily carried out. The aqueous solutions were first sparged with air in order to remove dissolved hexone. Thereafter, solid ammonium persulfate was added to obtain a concentration thereof of 0.1 M. By this addition, any trivalent chromium formed was converted to hexavalent chromium which was obvious by the appearance of a distinct reddish-orange color. Thereafter, ferric nitrate (2 and 0.5 g. of Fe$^{+++}$ per liter of solution, respectively, for Examples I and II) was added, and then a 10 N sodium hydroxide solution in a quantity to obtain a pH value of 7.65 was admixed. The precipitate formed consisted of ferric hydroxide carrying the americium and part of the residual plutonium values contained in the aqueous phase. This precipitate was separated from the liquid by centrifuging, washed several times with water and then dissolved in nitric acid. To the nitric acid solution of Example I there was then added ammonium persulfate to obtain a concentration thereof of 0.1 M, and the mixture was boiled for about thirty minutes in order to decompose excess of ammonium persulfate. Thereafter, 10 N sodium hydroxide was added in a quantity to yield a pH of about 7 to 8 whereby all iron and americium were precipitated. The precipitate was separated, washed with water until the effluent was practically colorless (removal of CrO$_4$=) and then dissolved in 800 ml. of concentrated hydrochloric acid to obtain a volume of about 1200 ml. The solution thus obtained had a concentration of 6 N HCl; it was shaken with 800 ml. of diisopropyl ether, and the phases were separated after settling. To the aqueous raffinate phase 150 ml. of concentrated hydrochloric acid was added in order to increase the hydrochloric acid concentration to about 7.2 N. The resultant aqueous solution was extracted twice each with a 800-ml. quantity of diisopropyl ether. Analyses of the ether phases indicated that less than 0.01% of the alpha activity (due to Am and Pu) was extracted. However, the iron was almost quantitatively removed from the acidic aqueous solution by the diisopropyl ether extraction. The over-all americium recovery was quantitative.

It will be understood that the initial carrier precipitate can be dissolved in the first place in hydrochloric acid and that the iron then can be immediately extracted with ether. However, the use of nitric acid had the advantage that a stainless steel centrifuge could be used without corrosion; moreover, the reprecipitation for the purpose of conversion to a hydrochloric acid solution also was responsible for a higher degree of separation.

It will also be understood that the purification of the americium can be enhanced by repetition of part, or all, of the process herein disclosed.

It will also be understood that this invention is not to be limited to the details given herein but that it may be modified within the scope of the appended claims.

What is claimed is:

1. A process for recovery and concentration of americium in an aqueous mineral acid solution containing americium salt and salt of plutonium in at least its tetravalent state, comprising contacting said solution with a substantially water-immiscible organic solvent whereby said plutonium salt is extracted into an organic solvent phase while the americium salt remains in the aqueous solution forming a separate phase; separating said aqueous phase from said solvent phase; adding a water-soluble ferric salt to said aqueous phase; adding an alkali metal hydroxide to said aqueous phase whereby ferric hydroxide precipitates carrying the americium values; and separating the carrier precipitate thus formed from the solution.

2. The process of claim 1 wherein the carrier precipitate is dissolved in hydrochloric acid, the acid solution thus formed and containing excess of hydrochloric acid is contacted with substantially water-immiscible organic solvent whereby the ferric salt is extracted into a solvent phase while the americium salt remains in the aqueous solution, and said aqueous solution is separated from said solvent phase.

3. The process of claim 1 wherein the solvent for the plutonium extraction is hexone.

4. The process of claim 1 wherein the alkali metal hydroxide is sodium hydroxide and is added in a quantity to obtain a pH value of approximately 7.5.

5. A process for the recovery and concentration of americium in an aqueous mineral acid solution containing americium salt and salt of plutonium in at least its tetravalent state, comprising contacting said solution with a substantially water-immiscible organic solvent whereby said plutonium salt is extracted into an organic solvent phase while the americium salt remains in the aqueous solution forming a separate phase; separating said aqueous phase from said solvent phase; adding a water-soluble ferric salt to said aqueous phase; adding an alkali metal hydroxide to said aqueous phase whereby ferric hydroxide precipitates carrying the americium values; separating the carrier precipitate thus formed from the solution; dissolving said precipitate in hydrochloric acid; contacting the acid solution thus formed and containing excess of hydrochloric acid with a substantially water-immiscible organic ether whereby the ferric salt is extracted into an ether phase while the americium salt remains in the aqueous solution; and separating said aqueous solution from said ether phase.

6. The process of claim 5 wherein the ether is diisopropyl ether.

7. A process for the recovery and concentration of americium in an aqueous nitric acid solution containing americium nitrate and trivalent plutonium nitrate, comprising adding sodium dichromate and refluxing the solution whereby substantially all of the plutonium is converted to the hexavalent state; adding a water-soluble nitrate as a salting-out agent; contacting the solution with acidified hexone whereby the plutonium is taken up by the hexone forming a separate phase, while the americium values remain in an aqueous phase; separating said aqueous phase from said solvent phase; sparging said aqueous phase with air whereby dissolved hexone is volatilized; adding an oxidizing agent to said aqueous phase to reconvert any trivalent chromium formed to the hexavalent state; adding a water-soluble ferric salt to said aqueous phase; adding alkali metal hydroxide until a substantial quantity of ferric hydroxide is precipitated carrying the americium values originally present; separating the carrier precipitate thus formed from the remaining solution; washing the precipitate; dissolving the washed precipitate in hydrochloric acid; contacting the resultant solution containing excess hydrochloric acid with diisopropyl ether whereby the ferric salt is extracted into the ether while the americium salt remains in the aqueous solution; and separating an ether phase from the americium-containing solution.

8. The process of claim 7 wherein the oxidizing agent for the chromium is ammonium persulfate.

9. The process of claim 7 wherein the carrier precipitate formed is allowed to remain in contact with the solution for several hours prior to separation therefrom.

10. The process of claim 7 wherein the excess hydrochloric acid is present in a concentration between 7.5 and 8.5 N.

References Cited in the file of this patent

UNITED STATES PATENTS

| | | |
|---|---|---|
| 1,870,214 | Aickelin et al. | Aug. 2, 1932 |
| 2,227,833 | Hixson et al. | Jan. 7, 1941 |
| 2,376,696 | Hixson et al. | May 22, 1945 |
| 2,523,892 | Warf | Sept. 26, 1950 |
| 2,811,415 | Seaborg | Oct. 29, 1957 |

FOREIGN PATENTS

| | | |
|---|---|---|
| 520,938 | Germany | Mar. 14, 1931 |

OTHER REFERENCES

Freundlich: "Colloid and Capillary Chemistry," translated from 3rd German edition, pages 220–222 (1922). Publ. by E. P. Dutton & Co., New York.

Kennedy et al.: "Properties of 94–239," MDDC–349, declassified July 22, 1946, page 2.

Fried: "The Chemistry of Americium Compounds," AECD–1930, page 1, declassified Apr. 15, 1948. Publ. by U.S. Atomic Energy Commission.